US009876766B2

(12) United States Patent
Ukena et al.

(10) Patent No.: US 9,876,766 B2
(45) Date of Patent: Jan. 23, 2018

(54) METHOD FOR ANONYMISATION BY TRANSMITTING DATA SET BETWEEN DIFFERENT ENTITIES

(71) Applicant: Telefónica Germany GmbH & Co. OHG, München (DE)

(72) Inventors: Jonathan Ukena, München (DE); Philipp Schöpf, München (DE)

(73) Assignee: Telefónica Germany GmbH & Co OHG, München (DE)

( * ) Notice: Subject to any disclaimer, the term of this patent is extended or adjusted under 35 U.S.C. 154(b) by 296 days.

(21) Appl. No.: 15/038,601

(22) PCT Filed: Nov. 28, 2013

(86) PCT No.: PCT/EP2013/003601
§ 371 (c)(1),
(2) Date: May 23, 2016

(87) PCT Pub. No.: WO2014/082749
PCT Pub. Date: Jun. 5, 2014

(65) Prior Publication Data
US 2016/0344702 A1 Nov. 24, 2016

(30) Foreign Application Priority Data

Nov. 28, 2012 (WO) .................. PCT/EP2012/004920
Oct. 24, 2013 (EP) .................... 13005086

(51) Int. Cl.
*H04L 29/06* (2006.01)
*G06Q 30/02* (2012.01)
(Continued)

(52) U.S. Cl.
CPC ...... *H04L 63/0421* (2013.01); *G06F 21/6245* (2013.01); *G06Q 30/0201* (2013.01);
(Continued)

(58) Field of Classification Search
CPC ............... H04L 9/0825; H04L 63/0428; H04L 63/0442; G06F 21/64
See application file for complete search history.

(56) References Cited

U.S. PATENT DOCUMENTS

2009/0048977 A1    2/2009  Aggarwal et al.
2009/0208018 A1*   8/2009  Buckingham ......... G06F 21/606
                                                    380/277
(Continued)

OTHER PUBLICATIONS

Chaum. "Untraceable Electronic Mail, Return Addresses, and Digital Pseudonyms," Communications of the ACM, vol. 24, No. 2, Feb. 1981, pp. 84-88.

*Primary Examiner* — Jason K Gee
(74) *Attorney, Agent, or Firm* — Dilworth & Barrese, LLP

(57) ABSTRACT

The present invention refers to a method for anonymization by transmitting an event data set from at least one data supplying entity supplying the event data set to at least one data aggregating entity aggregating the event data set wherein the data set includes at least one identifier identifying at least one user of the data supplying entity, the method comprises the steps of performing a non-reversible basic encryption of the at least one identifier using an encryption mechanism with a certain lifetime, iteratively performing an additional encryption of said basic encrypted identifier for n-times with n equal or greater than 1 resulting in an additional encrypted identifier, wherein the additional encryption comprises the steps of adding a random component to said encrypted identifier and encrypting the output using asymmetric encryption with a public key, wherein each iteration uses a random component with a lifetime shorter than the lifetime of the certain lifetime according to step a and than the lifetime of the previous iteration and a public key different to that of the previous iteration, trans-
(Continued)

mitting the event data set characterized by the n-times additional encrypted identifier to the at least one data aggregating entity, and undoing at least one iteration of the additional encryption(s) at the at least one receiving data aggregating entity.

20 Claims, 10 Drawing Sheets

(51) Int. Cl.
  *H04L 9/32* (2006.01)
  *G06F 21/62* (2013.01)
(52) U.S. Cl.
  CPC .......... *H04L 9/3228* (2013.01); *H04L 9/3297* (2013.01); *H04L 63/0442* (2013.01); *H04L 63/061* (2013.01); H04L 63/0407 (2013.01); H04L 2209/42 (2013.01); H04L 2209/80 (2013.01)

(56) References Cited

U.S. PATENT DOCUMENTS

| | | | |
|---|---|---|---|
| 2009/0292914 A1* | 11/2009 | Liu | H04L 9/0836 713/153 |
| 2009/0327486 A1 | 12/2009 | Sampat et al. | |
| 2011/0202774 A1* | 8/2011 | Kratsch | G06F 17/30489 713/189 |
| 2011/0264527 A1 | 10/2011 | Fitzpatrick et al. | |

* cited by examiner

METHOD FOR ANONYMISATION BY TRANSMITTING DATA SET BETWEEN DIFFERENT ENTITIES

BACKGROUND

The present invention refers to a method for anonymisation by transmitting an event data set from at least one data supplying entity supplying the event data set to at least one data aggregating entity aggregating the event data set wherein the data set includes at least one identifier identifying at least one user of the data supplying entity.

Communication systems enable communication between two or more entities. An entity in the context of this document should be defined as specific area that is organisational separated from other areas due to logical, physical or legal specifications. Besides moving payload data between these entities communication systems need to generate, collect and process management data such as addresses, locations, service descriptions etc. For instance, for a web server communicating with a client computer the web server needs to process the IP address of a client, requested URLs, HTTP header information and session data. In a mobile communication system additional data such as location information, type of services or identifiers identifying the mobile device (IMEI), the SIM cards (IMSI) are processed. Further, each communication relation creates additional data which are referred to in the following as a data set.

Further, said systems/networks, in particular mobile communication systems, might continuously collect additional data named as location event data during regular system/network operation. Each event data set is related to a specified event of an individual subscriber. Events may be triggered by a subscriber/user, the network or by a device which is of no importance for further processing. The data set includes several attributes describing different properties of the triggered event. These event data sets are associated with a personal identifier which enables allocation of the event data set to an individual subscriber of the communication system.

Furthermore, operators of communication systems register customer related data such as contact details and contract information. The collection of this data is either necessary for billing purposes or to hold available for authorities. In the following such data is defined as customer relation data (CRM). CRM data may get aggregated to form customer class data.

Due to holding this information such systems so called data supplying entities, in particular mobile communication systems, offer the possibility to provide information about the subscriber habits, for instance regarding their location data for a defined time interval. This data can either be used to create location profiles for geographical sites or to derive dynamic crowd movement patterns. In this context, the information could be useful for a wide range of applications in the area of traffic services, smart city services, infrastructure optimisation services, retail insight services, security services and many more. Therefore, it is desirable to provide the generated information in suitable form to parties so called data aggregating entities that benefit from applications like the aforementioned ones. Such parties could include local councils, public transport and infrastructure companies like public transport providers or electricity suppliers, retailers, major event organizers or public safety bodies and many more yet unknown uses and users.

However, it is mandatory to provide this information in an anonymous manner to protect the privacy of each individual, in particular each subscriber of the mobile communication system. Consequently, the provider of the mobile communication system (data supplying entity) supplying this information should only provide insights extracted from anonymised and aggregated data without selling disclosing personal information. Disclosure of any personal information is strictly prohibited in certain jurisdictions but may also be unwanted in others, tracking and identifying of individuals has to be avoided in any circumstances.

SUMMARY OF THE INVENTION

It is the object of the invention to provide a method for anonymisation of data collected or used within an arbitrary system or network and which are each related to an individual subscriber of the system.

The aforementioned object is solved by a method according to the features herein. Preferred embodiments are also subject matter of the features herein.

According to the invention a method for anonymisation of one or more identifier(s) of a data set is proposed. This is achieved by performing a very specific obfuscation technique combined with the transmission of such data set from at least one data supplying entity supplying the data set to at least one data aggregating entity aggregating the data set. The data set includes the at least one identifier identifying at least one subscriber of a system or network, in particular a mobile communication network. The data set already exists or is generated at the data supplying entity. The data aggregating entity is interested in information contained in said data set for any application purpose, such as data analysis for creating location profiles for geographical sites or derivation of dynamic crowd movement patterns.

To keep the privacy of the at least one subscriber of the data supplying entity the following method steps are performed to obfuscate the personal information about the subscriber:

a. performing a non-reversible basic encryption of the at least one identifier using an encryption mechanism with a certain lifetime, b. iteratively performing an additional encryption of said basic encrypted identifier for n-times resulting in a n-times additional encrypted identifier with n equal or greater than 1,
   wherein the additional encryption comprises the steps of adding a random component to said encrypted identifier and encrypting the output using asymmetric encryption with a public key,
   wherein each iteration uses a random component with a shorter lifetime than the lifetime of the previous iteration and a public key different to that of the previous iteration, wherein the lifetime of the first iteration is shorter than the certain lifetime according to step b, c. transmitting the event data set characterised by the n-times additional encrypted identifier to at least one data aggregating entity.

d. undoing at least one iteration of the additional encryption(s) at the at least one receiving entity.

In step a, a first encryption of the at least one identifier is performed using an encryption mechanism with a specific lifetime, that is to say the mechanism produces the same output within a such time interval (lifetime). In particular, said encryption is performed by a hashing function with a seed which is created in a secure environment and never known to any of the involved entities. Such secure environment for instance could be established by using adequate crypto hardware or a properly secured software component. Such component would also be able to distribute the secret seed to different entities. This would for instance enable even different companies to generate identical encrypted representation for one and the same identifier. The seed can be changed after a certain time interval (lifetime), preferably on a regular basis. This first step is called base anonymisation and leads to a so called base anonymised personal identifier.

In a second step (step b), a random component, e.g. a number of random characters defining a character string, preferably comprising alphanumeric characters, in particular a number of digits and/or letters and/or any other type of symbols, is added to the single encrypted obfuscated identifier. Again, the random component may be changed after a certain time interval, preferably on a regular basis. The lifetime of the random component is less than the lifetime in step b, in particular according to the seed used in the base anonymisation.

After appending the random component the result is encrypted by an asymmetric encryption mechanism. The data supplying entity uses the public key of the data aggregating entity for encryption. The outcome of step b) is a base anonymised and 1-time (n=1) additional encrypted personal identifier.

Step b is called additional encryption. The additional encryption may be performed in several iterations (n-times) leading to interleaved multiple obfuscated identifiers (base anonymised and n-time additional encrypted personal identifier). The random component of one iteration is changed after a shorter period of time than the one of the previous iteration. Due to these iterations, the result of a certain iteration is only accessible if the iterations executed afterwards have already been reversed.

In a particular preferred embodiment the last iteration uses a lifetime which is valid only for a single event, i.e. the random component changes after every event (data set). The last iteration of additional encryption always has to use a constantly changing random component, so that the outcome of this last encryption iteration has no stability at all. The number of additional encryptions thereby defines the maximum number of different kinds of anonymous identifiers (with potential different lifetimes per kind) that could be used within a chain of several data aggregating entities successively processing the data. Due to these iterations, the result of a certain iteration is only accessible if the iterations executed afterwards have already been reversed.

In the next step c, the data set including the base anonymised and n-time additional encrypted personal identifier is transmitted to at least one data aggregating entity.

In the last step d the at least one data aggregating entity gets the data set and undoes the last (n-time) additional encryption. Therefore, the appropriate private key of the aforementioned asymmetric key pair is used for revealing the combination of base anonymised and n-1-time additional encrypted personal identifier together with the random component. Based on the knowledge how both values where combined, the random component can be removed. This ends up to the base anonymised and n-1-time additional encrypted identifier. The lifetime of such identifier was set in the n-1 additional encryption. Within this lifetime the data aggregator is able to link data sets initially related to one and the same individual and to perform calculations on based on the combined data sets.

Preferably, it is possible that the data aggregator can forward either the original data set received before or an adjusted data set, for instance with the outcome of performed calculations, to at least one other data aggregating entity on the data transmission path. The base anonymised and n-1-time additional encrypted personal identifier is used as identifier of all forwarded datasets.

In particular preferable, the at least one following data aggregating entity receiving the forwarded data set/calculated outcome and base anonymised and n-1-time additional encrypted personal identifier can undo the n-1-time additional encryption and so on. The last data aggregating entity on the data transmission path undoes the first additional encryption and works with the base anonymised personal identifier which offers the longest lifetime within the transmission path.

The whole method is named as Multilevel Anonymisation Process (MAP) which is executable in parallel instances. The configuration of one MAP instance defines the base anonymisation (lifetime of secret seed) as well as n iterations of additional encryptions (for each: lifetime of random component, way of combining random component with encrypted identifier, public key to use for encryption). The outcome of such an instance is a nesting of n different kinds of identifiers each potentially with specific lifetime for a number of data aggregating entities processing data subsequently upon one data transmission path. Thereby, the lifetime according to step a, in particular the lifetime of the secret seed defines the maximum lifetime for any kind of identifiers within the different data aggregating entities. Each iteration of additional encryption can only define a lifetime shorter than the one that was defined in the previous iteration. Preferably, the last iteration of additional encryption always uses a constantly changing random component, so that the outcome of the MAP at the at least one data supplying entity has no stability at all.

Beyond such definition for subsequently operating data aggregating entities it would also be possible to define different kinds of anonymous identifiers for data aggregating entities operating on parallel data transmission paths. This would be done by defining different MAP configurations running at parallel MAP iterations.

The invention discloses a multi-level anonymisation process, preferably implemented as a part of a communication system at the at least one data supplying entity and a generic computer system at the at least one data aggregating entity. By performing the aforementioned steps at least one personal identifier included in the data set is anonymised to avoid any inference on the respective individual or user outside the data supplying entity. Preferable, as soon as the execution of the method is started the data supplying entity is not able to read and/or modify and/or decrypt the personal identifier. Base anonymisation and n iterations of additional encryptions run in a closed system at the at least one data supplying entity. Therefore, such entity will have no access to any interim results.

The inventive approach results in a strict (technical) separation of individual related identifier(s) in the at least one supplying entity and not individual related identifier(s) in the at least one data aggregating entity. This separation is irreversible at one single entity, either at the data supplying entity or at the data aggregating entity. Therefore, a conclusion to an individual based on the identifier used in the at least one data aggregating entity would always need the cooperation of such entity with the at least one supplying entity.

Based on this technical separation the effort of finding out a user's identity based on the identifier used in the at least one aggregating entity directly correlates to the level of organisational separation between such aggregating entity and the at least one data supplying entity. In other words, the higher the level of organisational separation, the higher the effort to find out an individual's identity based on the identifier used in the at least one aggregating entity. For instance, a high level of organisational separation is ensured if the at least one data supplying and the at least one data aggregating entity are implemented in different legal premises like it would be the case in independent companies. Furthermore, it may be conceivable that the at least one data supplying entity and/or any trusted partner (to be defined later on) and/or the at least one data aggregating entity are represented by two independent processes executed on the same system and/or on physically separated systems, in particular located at different installation locations.

Within the definition of German Data protection law data is defined as anonymised in the very moment the effort to reveal an individual's identity is seen as unproportional regarding costs, time and workforce. Without such an unproportional effort the data is seen as pseudonymised only (§3 Abs. (6) BDSG). Therefore, the possibility of influencing the effort is critical to reach anonymity regarding to German data protection law. The invention enables this by introducing a method performing a (strict) technical separation of individual related and non-individual related identifiers which is irreversible within one single entity. Based on this the actual deanonymisation effort is directly adjustable by the chosen level of organisational separation.

According to a preferred embodiment the method enables the at least one data supplying entity to set the time horizon in which the at least one data aggregating entity gets stability for its anonymous identifiers. Therefore, the at least one data supplying entity always has the control how long one or more data aggregating entities are able to link data sets initially occurred for one and the same user. This again is very important for data protection reasons especially when the data aggregating entity works with dynamic data related to users behaviour (e.g. location data). In such a case, the length of the time interval in which the data could be combined (based on a stable anonymous identifier) directly influences the possibility of the at least one data aggregating entity to find out specific patterns. Such a pattern could allow indirect conclusion to the individual based on the combination with additional information.

In the example of location data this could be a unique movement pattern. Comparing such a pattern with additional 3rd party information (e.g. location based check in data given by the user within social networks) could offer a theoretical possibility for indirectly revealing the users identity. Of course, this threat rises with the time interval in which dynamic data events could be allocated to one and the same anonymous identifier. This is because on the one hand the pattern becomes more unique on the other hand the likelihood to find adequate additional information rises.

In a preferred aspect of the invention the at least one data supplying entity is a mobile communication network. If so, at least one identifier identifying a subscriber of the data supplying entity can be an identifier identifying a subscriber and/or a mobile device in a mobile communication system, such as the IMEI, IMSI or similar identifiers given by the technical mobile communication standard (e.g. MAC-Address) or defined by software that uses such technical infrastructure (e.g. Account Credentials within mobile Apps or Operating Systems).

In a further preferred aspect of the invention the data set includes at least one data attribute associated with the at least one identifier/user and including is at least one of the group of type of event and/or timestamp of an event and/or location of an event. In detail, in a mobile communication system a data set may comprise an IMSI as an identifier and further data attributes characterising an event currently actively triggered by the respective user or mobile device, for instance a service request (voice, data, etc.) or an executed position finding process or any other possible active or passive event which might be triggered in a mobile communication network.

For instance, at least one attribute of the data set includes user event information characterising the type of event currently captured and/or the timestamp of an event and/or the current user location at said timestamp. In detail, in a mobile communication system the data set may comprise the IMSI as an identifier and the type of service, for instance SMS, circuit switch voice, packet switch data, and/or the timestamp and/or the exact or estimated position of the user demanding for the respective type of service. The position thereby could also be derived indirectly by the position of celltowers, etc.

In a preferred embodiment one instance of the MAP is configured to use a secret seed with a long lifetime in the base anonymisation as well as two additional encryptions whereby the first additional encryption uses a random component with a short lifetime and a public key provided as one part of an asymmetric key pair by a data aggregating entity (in the following named "Data Aggregator"). The second additional encryption uses a constantly changing random component for every single function call together with the public key of another data aggregating entity (in the following named "Trusted Partner"). The two data aggregating entities operating subsequently on the data transmission path whereby the Trusted Partner is the first and the Data Aggregator the second entity.

The combination of data set and 2-time additional encrypted personal identifier is transmitted to the Data Aggregator via the Trusted Partner. The Trusted Partner undoes the second additional encryption and optionally processes and/or transforms the information included in the data before forwarding it to the Data Aggregator. Decoding of the 2-time additional encrypted personal identifier at the Trusted Partner and the 1-time additional encrypted personal identifier at the Data Aggregator side is performed by decrypting on the basis of the respective private key of the applied asymmetric encryption mechanism. Therefore, it is necessary that the last iteration of additional encryption was based on the public key of the Trusted Partner. The previous iteration has to be based on the public key of the Data Aggregator which receives the identifier from the Trusted Partner.

However, it is not necessary that the Trusted Partner or the Data Aggregator is informed about the concrete used character string used as the respective random component. It is sufficient that each entity knows in which way the character string has been combined with the string of the encrypted identifier of the previous iteration. The Data Aggregator will arrive at the encrypted identifier of the previous iteration or at the long lifetime base anonymised personal identifier according to the step a of claim 1 by erasing the known number of characters at the known positions in the resulting string of the asymmetric decryption.

In a preferred embodiment the lifetimes of the long lifetime according to the basic encryption and/or the short lifetimes according to the additional encryption can be varied, in particular depending on the attributes of the event data sets. For instance, the long lifetime is defined to be valid for one year. The first iteration of the additional encryption may use a short lifetime of about 24 hours. It is obvious that other time intervals or combinations of different lifetime are conceivable. The method preferably selects the appropriate lifetime for the basic anonymisation depending on the identifier and/or the attribute of the data set to be transmitted. The lifetime defines a time interval within the encrypted identifier is deemed to be valid by the destination entity (Trusted Partner and/or Data Aggregator).

As mentioned before the last iteration of the additional encryption is decrypted at the at least one Trusted Partner by using its respective private key and by removing the random component resulting in an encrypted identifier with a short lifetime. Data sets transmitted to the Trusted Partner are only applicable within the short lifetime of their associated short lifetime encrypted identifier. This is a measure of precaution to avoid derivation of patterns from a certain number of stored data sets building a detailed event history.

Therefore, it is particular preferred to extrapolated trends from a collection of data sets over a defined time interval. These trends a called as statistical indices derived from a number of event data sets and/or data attributes related to the same encrypted identifier which has been decrypted at the Trusted Partner and collected within the lifetime of said encrypted identifier.

In a preferred aspect of the invention the derived statistical indices include at least one attribute including one of the group of index type and/or reference and/or value of likelihood and/or frequency and/or probability of error. The attribute index type defines a certain event type or a combination of certain event types. For instance, the statistical indices may refer to a mobility index characterising the frequency and/or likelihood for a certain encrypted identifier associated with a certain location. In that case, the index type refers to a possible habitation of a subscriber associated with the encrypted identifier.

It is also possible that at least one statistical index refers to an activity index characterising the frequency and/or likelihood for a certain encrypted identifier associated with a certain event, for instance outgoing calls/SMS of a subscriber associated with said encrypted identifier.

The likelihood or frequency attribute of the statistical indices stands for a relative probability and/or absolute frequency and/or a particular likelihood/frequency class of one or some of the attributes collected within the data sets. The statistical probability may define the occurrence of a defined event at a defined location. The frequency attribute may include a numerical value representing the number of events occurred at a defined location. The reference value characterizes the outcome of the statistical index, i.e. the attribute with the highest probability/frequency. Lastly, the statistical indices include an attribute characterizing the error probability of the reference value.

In a preferred embodiment, said derived statistical indices are forwarded together with their related 1-time additional encrypted personal identifier to the Data Aggregator. In that case the first iteration is decrypted at such entity by using its respective private key and by removing the random component resulting in a base anonymised personal identifier with a long lifetime, i.e. the identifier after the base anoymisation.

The Data Aggregator collects the received likelihoods and/or frequencies related to said base anonymised encrypted identifier within the long lifetime period. In that case data sets collected within the short lifetime according to the Trusted Partner and transformed to statistical indices can be stored at the Data Aggregator as long-term statistical indices which will survive the selected long lifetime of the respective event. In particular, calculation of long-term statistical indices that allow likelihood statements on mobility and activity based on location event data is possible without saving any detailed event history. Statistical indices may be kept and used within a long time interval, for instance over one year. Location event data can be discarded after a short time interval, for instance after 24 h, to minimize the risk that movement patterns are derivable from the stored location event data. By using indices instead, no conclusion about the real identity of a location event data generating user can be drawn.

Preferable, it might be important to recognize and filter out irregularities to generate accurate statistical statements. Filtering can be done by way of integrating historical comparison-values over a longer period of time. The suggested approaches allow deriving of likelihood statements on mobility and activity based on real anonymised data without saving any detailed event history which could be used to derive patterns that allow making conclusions on the identity of an individual.

Another embodiment of the invention introduces a technique how different types of information that has been calculated based on different kinds of anonymised identifiers could be combined in an anonymous way regarding the used identifiers.

For some applications it might become necessary to combine different types of information generated at different data aggregating entities or within at least one aggregating entity by using different kinds of anonymous identifiers for each type of information. Such combination could be required within one of the said data aggregating entities as well as within at least one other (new) data aggregating entity. By performing such combinations it is very important to keep the anonymity of the data, within each of the involved entities. The translation method considers this critical criterion regarding the used identifiers, by keeping the different kinds of internally used anonymous identifiers separated at any time. Preferably this is archived by an indirect matching via a unique temporal component like a character string or an alphanumeric number for instance.

In the case that one and the same data aggregating entity owns one or more types of information and wants combine them, the matching process has to be performed at a separated data aggregating entity.

All involved data aggregating entities could be classified to one of the following roles:
"integrator" that combines different types information based on at least one internal table uses one specific base anonymised personal identifier
"extractor" that owns at least one type of information that should be combined with at least one other type of information at an integrator entity
"hybrid" that owns at least one type of information and wants to combine it with at least one other type of own information and/or wants to enrich at least one type of own information with at least type of other information he will get from at least one extractor Based on this definition the following steps are performed:
a) Building a "big matching table" containing one data tuple for each personal identifier of the at least one data supplying entity. Each data tuple consists of:
one base anonymised and 1-time additional encrypted personal identifier for each different types of information that should be extracted from at least one extractor and/or hybrid data aggregating entity
one base anonymised and 1-time additional encrypted personal identifier for each internal table within at least one integrator and/or hybrid data aggregating entity
one unique temporal component b) Based on the big matching table: Generating one "small matching table" for each kind of base anonymised and 1-time additional encrypted personal identifier that was built in step a). Each small table thereby includes a data tuple containing the base anonymised and 1-time additional encrypted personal identifier together with the unique temporal component c) Distribution of the at least one adequate small table to all involved data aggregating entities. In the case of a hybrid data aggregating entity the small matching table that should be used for integration is distributed to another, separated data aggregating entity.

d) Expect of the separated data aggregating entity, each data aggregating entity gets the at least one adequate small table and undoes the 1st additional encryption and therefore reveals the base anonymised personal identifiers.

e) Depending on their classification the different data aggregating entities perform the following actions:
Integrator: Save the internal small matching table to use it for integration later. I.e. save every combination of base anonymised personal identifier and associated unique temporal component. Wait for data sets that would be sent with unique temporal component as identifier. When receiving such data sets lookup the internal base anonymised personal identifier in the small matching table and process the data sets based on this identifier.
Extractor: Save the internal small matching table and use it for extraction and forwarding. I.e. lookup the needed information based on the internal base anonymised personal identifier. Replace the internal base anonymised personal identifier with the associated unique temporal component within the data sets and forward such data sets to at least one data aggregating entity classified as integrator or hybrid.
Hybrid: Save the small matching table and carry the information analog to the extractor based on the internal base anonymised personal identifier. Than reorder the table of carried information based on the unique temporal component. Forward this reordered table to the separated data aggregating entity that owns the small matching table that could be used for integration. Such neutral data aggregating entity replaces all unique temporal components by the associated base anonymised and one time additional encrypted personal identifiers. Based on these identifiers the table is reordered again and sent back to the hybrid data aggregating entity. Here the 1st additional encryption is undone. Based on the resulting internal base anonymised personal identifier the hybrid data aggregating entity is able to process the data.

Depending on the requirements specific requirements (e.g. lifetime restrictions of the base anonymised personal identifier within the integrating or hybrid data aggregating entity) it could be necessary to repeat the aforementioned steps a-e on a regular base. The introduced integration method by using a separated (neutral) data aggregating entity could optionally also be used to integrate information from different data aggregating entities classified as extractor instead of hybrid. This could be useful especially in cases where the combination of different information needs to be double checked regarding deanonymisation risks potentially given trough the kind of information itself. In this cases the separated data aggregating entity could also perform needed transformations to ensure anonymity before forwarding the combined information to the at least one data aggregating entity classified as integrator.

The generation of the different kinds of base anonymised and 1-time additional encrypted personal identifier within step a are performed by running parallel MAP instances. The configuration of each instance thereby includes a base anonymisation and one additional encryption. For configurations that concern data aggregating entities classified as extractor or hybrid each base anonymisation uses the same secret seed that is also be used for the anonymisation of the data sets that are already stored at such entities. For data aggregating entities classified as integrator this is not necessary. It is sufficient to have a secret seed with a certain lifetime. The additional encryption is not dependent on the classification of the data aggregating entity. For each configuration it is only important to choose the appropriate private key of the respective data aggregating entity and changing the random component for every new big matching table (at every functional call).

Exemplary for the ALIP process for deriving statistical indices the derived long-term statistical indices should be integrated to a certain database at the data aggregating entity where it already stores other type of information with a different kind of base anonymised personal identifier than the one that is used for the derivation of the long-term statistical indices. The data aggregator in this case could be classified as hybrid. Said database may administrate collected data on the basis of the base anonymised and 1-time additional encrypted identifier used for the data sets already stored at the data aggregator. In a preferred embodiment the mapping process can be based on a translation table including tuples each consisting of the long lifetime base anonymised and 1-time additional encrypted identifier used for the long-term calculations according to step a, a base anonymised and 1-time additional encrypted identifier, in particular with a short lifetime identifier, and a unique number. The table might be generated in parallel to the general multilevel MAP process.

The invention is further related to a communication system for performing the method according to the invention or according to a preferred embodiment of the invention. It is obvious that the communication system is characterised by the properties and advantages according to the inventive method. Therefore, a repeating description is deemed to be unnecessary.

BRIEF DESCRIPTION OF THE DRAWINGS

Further advantages and properties of the present invention should be described on the basis of three preferred embodiments shown in the figures. The figures show

DESCRIPTION OF THE PREFERRED EMBODIMENTS

Figure 1A:
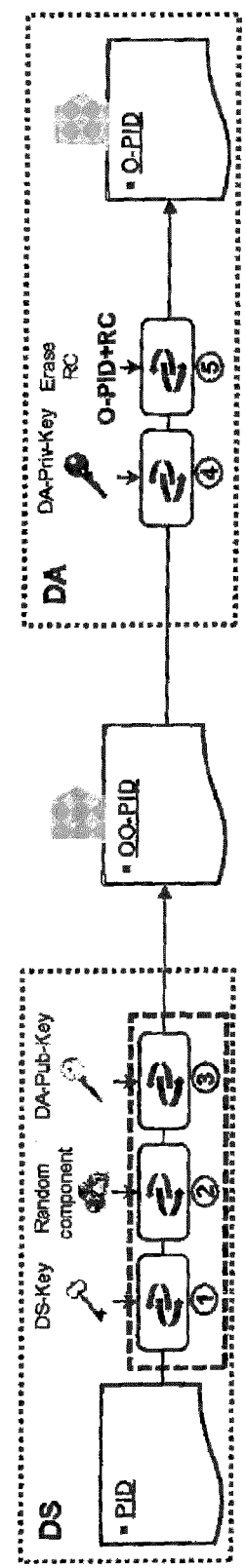
FIG. 1a: a schematic overview over the basic multilevel Anonymisation Process (MAP)

FIG. 1a illustrates the fundamental idea of the present invention. The basic idea of the present invention relates to a data anonymisation procedure to enable the usage of mass location data for big data applications with fully respect of European data protection standards. Mass location data will be collected by mobile or wireless communication network providers as well as providers that collecting information which are based on other location technologies like GPS, Galileo, GLONASS, Compass, Sensor networks, etc. which additionally also may possess detailed and verified personal information about their users. However, applications without concrete personal information are also possible. An example is the application of MAC-Addresses within a WIFI-network.

Further, mobile network providers are able to extract location event data of their users. All information is combined within anonymised data sets which might be of interest for different applications offered by third party companies.

For instance, mobile network providers might sell or provide the anonymised and aggregated data to local councils, public transport companies, infrastructure companies like public transport providers or electricity suppliers, retailers, major event organisers or public safety which use such information for improving their decision making processes.

Provided data sets may also be analysed to determine how many people visit an area by time, gender and age. Organisations will be able to analyse the movements of crowds at any given place by hour, day, week or month, and make like-for-like comparisons by area as well as understand catchment patterns.

A particular application of the data might be the implementation of smart cities. The aforementioned data analysis could be used to analyse the traffic volume at certain city districts. Therefore, city council can optimise road engineering on the basis of said information. Of course, said information is useful for each construction planning taking into account the amount of potential users/visitors.

However, it is mandatory to take care of the privacy of each user and personal user information. Therefore, it is the object of the present invention to define a process which enables real anonymisation instead of just pseudo-anonymisation. By splitting over the process into several process steps that were executed within different legal premises of independent entities, the possibility of generating an allocation table between anonymised and not anonymised identifiers is prevented.

As can be seen in FIG. 1a a data supplier as a first entity and referenced as DS is communicatively connected over a public or a virtual private network to a data aggregator as a second entity and referenced as DA. The data supplier entity DS can be any provider of movement and/or personal data. This includes for example mobile or wireless network providers as well as providers that collecting information which are based on other location technologies like GPS, Galileo, GLONASS, Compass, Sensor networks, etc. The following argumentation will be based on the exemplary case of a mobile network system which provides the aforementioned data sets containing personal data as well as location event data about its users.

As described DS and DA are physically separated and assigned to independent systems. Generally, DS and DA fulfill different tasks which can be assigned to different users having differing authority profiles on a common system or performed within different security zones of a common system.

The exemplary embodiments according to the figures are based on a mobile network system as a data supplier DS which provides the aforementioned data sets containing personal data as well as location event data about its subscribers. Each individual subscriber of the overall network of the DS is identified by a personal identifier PID which might be a known identifier as the IMSI of a subscriber. To have a real anonymisation according to European data protection standards, it is inter alia necessary to have separation of the initial PID and its counterpart, the O-PID (obfuscated personal identifier). In this context, the effort of bringing together these two identifiers has to be unreasonably high compared to the yield which could be earned by such an action.

This requirement is fulfilled if the separation is realized physically within the premises of two legally independent entities whereby one entity only knows the PID and the other one only the O-PID. However, the separation of the DS and DA can also be realized by one of the alternative possibilities as proposed above. In any case, it is necessary to encrypt and transmit the O-PID to an entity named as the data aggregator DA. That personal identifier is combined to a data set with additional data attributes describing a certain location event. For instance, these event data attributes characterize an action of a subscriber at a certain place. Possible attributes are the event type, event location and timestamp. In this example, encryption is only performed for the personal identifier but can also be done for other data.

The obfuscation of the sensible data should be realized by a multi-level anonymisation process (MAP) performed at the DS to protect the user privacy. An overview of the necessary steps is given in FIG. 1a.

In a first step 1, a base anonymisation is performed by applying a non-reversible, keyed hashing algorithm to the PID, where the seed/key (DS-key) is only known to the data supplier DS. Said hashing algorithm should be a strong cryptographic hash function. Different DS-keys may be available at the DS side having different lifetimes like ST/LT (short-time/long-time), for instance. The output of the first method step is a single obfuscated PID referenced as O-PID. The lifetime of such O-PID is dependent on the interval the DS-Key is changed. That is to say, if the DS-Key is for example constant for 24 hours, the DA will get a static obfuscated identifier for exactly such period of time. The type of DS-key used for obfuscating the PID depends on the data set/data attributes which are transmitted to the DA or Trusted Partner TP in combination with the obfuscated PID. For instance, a short term key (ST-key) is used for obfuscating the PID which is sent in combination with customer class data wherein a LT-Key is used for the MAP process when obfuscating the PID for transmitting location event data sets.

In a second step 2 a random component RC or string, e.g. preferably a multi-digit random number is added to the output O-PID of the base anonymisation procedure according to the first step 1. It is noted that the random component might be inserted at any position of the O-PID wherein the position has to be known by the DA. It is further noted that any other randomly generated character string and any other procedure of combining the two strings might be appropriate. The interval length of the used random component could also be variable, but has to be known by the DA. The output of the second step is marked as O-PID+RC.

In the last step 3 a second-level encryption is executed on the basis of an asymmetric encryption mechanism using the public key DA-Pub-Key of the second entity DA. The asymmetric encryption is applied to the outcome of step 2 O-PID+RC resulting in an outcome which is marked as OO-PID. Consequently, the PID is double obfuscated to protect the user privacy.

The lifetime of double encrypted identifier OO-PID is only depending on the interval on which the random component used in step 2 is changed. This means that the OO-PID is constant as long as the RC is constant which is important for calculations done on the OO-PID by a certain entity (e.g. a Trusted Partner building statistical indices as will be described later on). In contrast, the actual value of the random component is not required for decoding of the OO-PID at the DA.

Steps 1-3 are implemented in an atomic unit of work. It is impossible for the data supplier DS to read or write any information generated between the single steps. The combination of steps 2, 3 is called as additional encryption "AE".

At the data aggregator side DA decryption is executed on the additional encryption according to step 3 by using its private key DA-Priv-Key to decrypt the received encrypted identifier OO-PID. The outcome O-PID+RC will be further processed by erasing the known number of digits at the end of the string that represent the random component. The resulting outcome is the O-PID. The lifetime of this single encrypted identifier O-PID at the data aggregator side DA is defined by the interval length of the generated DS-Key. If the interval length of the DS-Key has elapsed, a new DS-Key and therefore a new O-PID will be generated at the DS.

The original PID is only visible at the data supplier side DS since the data aggregator side DA only knows the single encrypted identifier O-PID. Therefore, it is impossible to build a catalogue (a table that assigns each non anonymised PID to its anonymised counterpart, the O-PID) within the premises of one single party.

The outcome of the above-explained multi-level anonymisation process (MAP) is that the data supplier DS is not able to find out the obfuscated PID. The same applies to the data aggregator DA which is not able to find out the original PID on the basis of the supplied obfuscated PID.

Figure 1B:
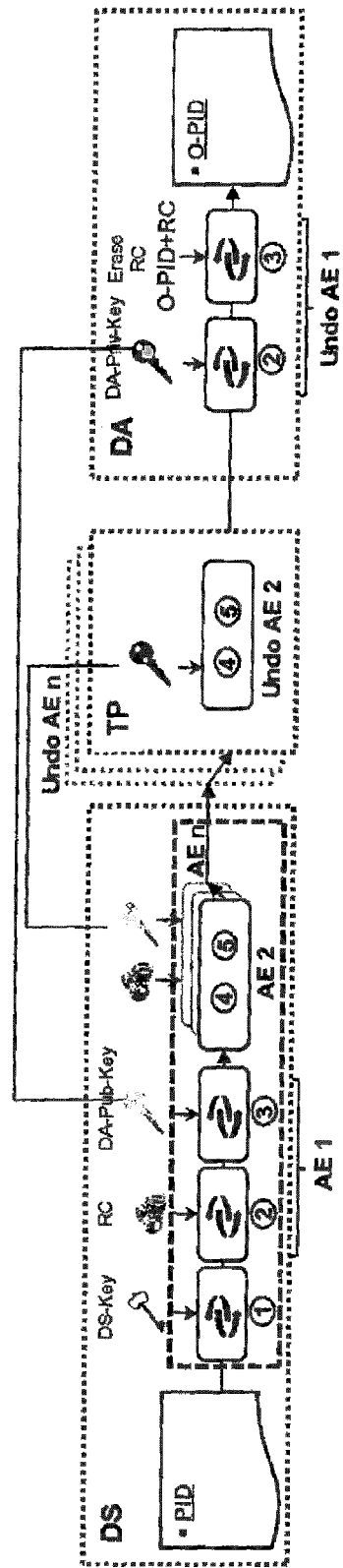
FIG. 1b: a schematic overview of the multi-iteration implementation of MAP according to the invention.

FIG. 1b shows an extended version of MAP according to FIG. 1a called MAP Multi-iteration implementation. The present invention refers to said MAP Multi-iteration implementation. Said extended version of MAP is mainly used for building long-term statistical indices of collected data sets.

In contrary to the basic implementation of MAP according to FIG. 1a the inventive extension of MAP performs the additional encryption (AE) iteratively with at least two iterations. However, an arbitrary number n of iterations is possible. The number of iterations depends on the number of data aggregating entities/Trusted Partner TPs which are available for decrypting the respective iterations of the additional encryption. Each public key of each iteration is dedicated to a defined data aggregating entity/Trusted Partner TP comprising the allocated private key.

The constancy interval of the used seed (DS-Key) at the DS is equal to the lifetime of the O-PID and consequently determines the maximum lifetimes of all n-times obfuscated identifiers upon the transmission part in the middle. The concrete lifetime of each n-times obfuscated identifier at the several TPs on the transmission path is equal to the lifetime of each random component used in the appropriate AE iteration.

The used seed (DS-key) of the basic anonymisation has the longest lifetime, called as LT lifetime, for instance one year. The lifetime of the random component RC of the iterations is called as short lifetime ST. The lifetime of the random components decreases with an increasing number of iterations. For instance, the random component of the first iteration of AE has a short lifetime of 24 hours and the random component of the last iteration of AE is changed for every data set in order to avoid rainbow table building at DS.

Figure 2A:
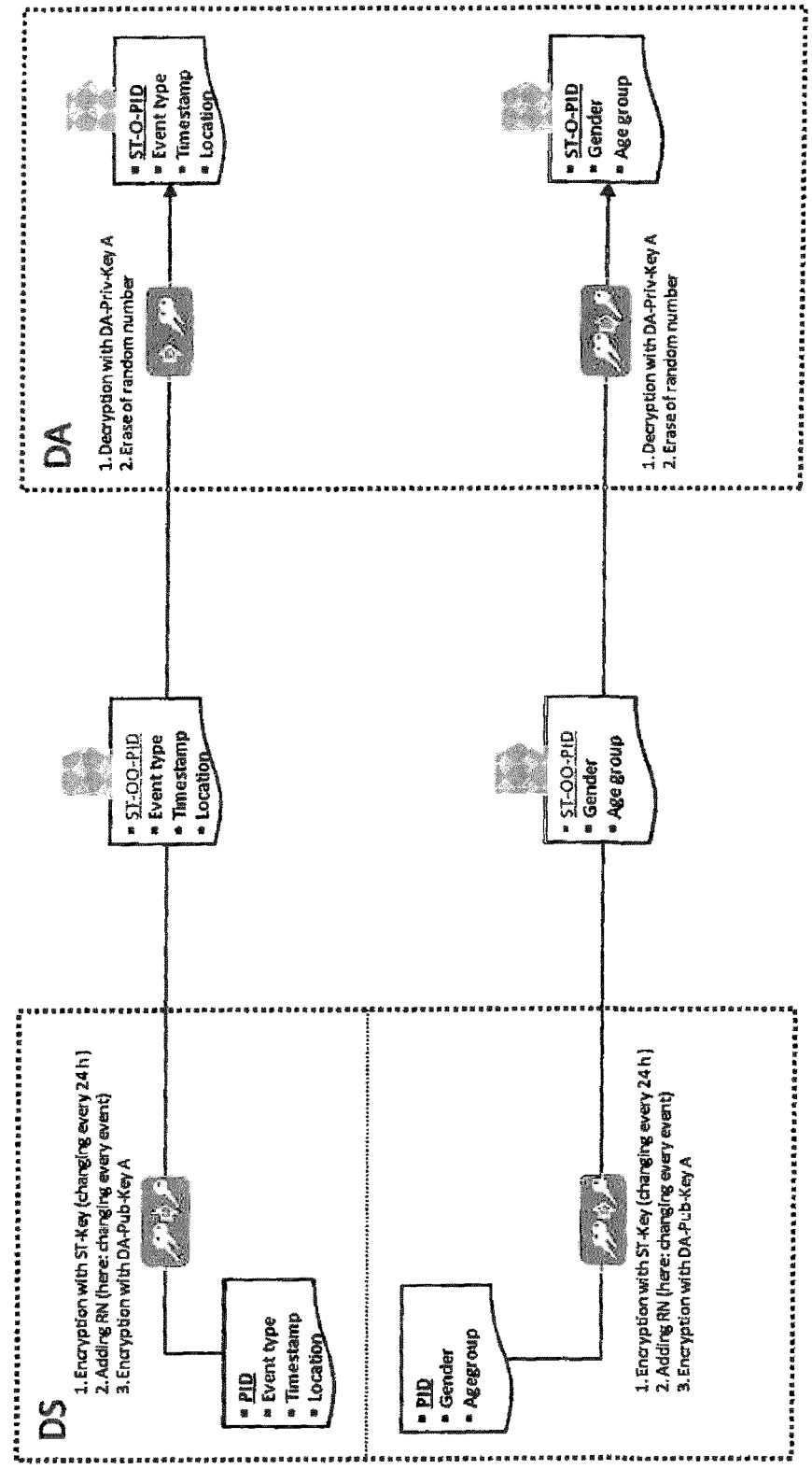
FIG. 2a, 2b: two versions of an architectural overview over a system for MAP implementation

An architectural overview over a system is given in FIG. 2a for a basic explanation of the implementation of the basic MAP process. It describes a technical solution for anonymisation of different data sets delivered by one single data supplier DS. Anonymisation as well as the transmission of these data sets to one single Data Aggregator DA is processed by entirely separated processes running at the data supplier DS. The different data sets can be combined on the basis of their equal identifiers at the Data Aggregator DA. This embodiment is appropriate, if the data supplier DS is subject to legal or other constraints regarding the combination of specific data sets in non-anonymised form. Regarding to European data protection standards this applies for the combination of location event data with personal customer data, for example.

Therefore, the whole process is subdivided into two independent multi-level anonymisation processes (MAP), where the personal identifiers PIDs (as unifying elements between the data sets) are separately anonymised and transmitted to the data aggregator DA, together with their respective data sets. Thereby, the first MAP process is responsible for transmitting the so called location event attributes including the event type, a timestamp and the user location.

The second process is responsible for transmitting attributes classifying the users/identifiers into different user class groups, for instance gender or age groups.

As can be seen in FIG. 2a, both processes execute the first-level encryption on the basis of an identical DS-Key. The lifetime of this key has exemplary been set to 24 hours. To distinguish this kind of DS-Key from other keys required for other applications, as well as to have a general naming for further argumentation this DS-Key is defined as short-term or ST-Key (referencing to its relatively short lifetime). In a second step individual random numbers RN are added to the outcomes of the first steps. The random numbers are changed for every encryption procedure of any new data set. Therefore, the random numbers RN will differ within the first MAP for every single location event and between the two MA processes itself.

In the third step a second-level encryption is executed on the O-PID+RN by use of DA-Pub-Key A. This key is generated from the data aggregator DA as part of an asymmetric key pair A. The DA provides the DA-Pub-Key A to the DS for the purpose of performing the second-level encryption. Later, this could be decrypted by use of the DA-Priv-Key A which is only known to the DA. In this context the capital "A" is meant as a counter. When having more than one asymmetric key pair they could be distinguished by the capital (key pair A, B, C, . . . ). In the given embodiment both MAPs performing the second-level encryption employ the same public key DA-Pub-Key A. The outcomes of the third steps are double encrypted PIDs. Since these double encrypted PIDs are based on O-PIDs generated by use of a short-term ST-Key as defined in step one the double encrypted identifier OO-PID should be named as ST-OO-PID. Different ST-OO-PIDs are transmitted in combination with their respective attributes over different transmission paths by each MAP.

Due to the fact that the random number is different within every second-level encryption procedure the resulting encrypted ST-OO-PIDs are each unique. I.e. one specific ST-OO-PID always belongs to one specific data set, therefore, the lifetime of a ST-OO-PID is restricted to a single event (which in this context includes the generation of location event data as well as customer class data). Consequently, it is impossible to combine neither customer classes (gender, age group) and event data (event type, timestamp, location) nor several location event data sets within the data supplier DS premises or on the transmission path to the data aggregator DA.

The aforementioned data combination can only be performed by the data aggregator DA. Therefore, the data aggregator firstly decrypts the ST-OO-PID with the respective private key (DA-Priv-Key A) corresponding to the DA-Pub-Key A provided to the data supplier DS. The outcoming string includes the O-PID in addition with the random number RN. As DA knows the number of digits blocked for the RN at the end of the string the data aggregator simply removes the number of digits to get the O-PID. Based on this unifying element the DA can combine the data for a time period corresponding to the lifetime of the ST-Key used by the DS to generate the O-PID. Thus, the DA could combine a number of location events together with customer class data for a static O-PID over a time period of 24 hours.

Figure 2B:
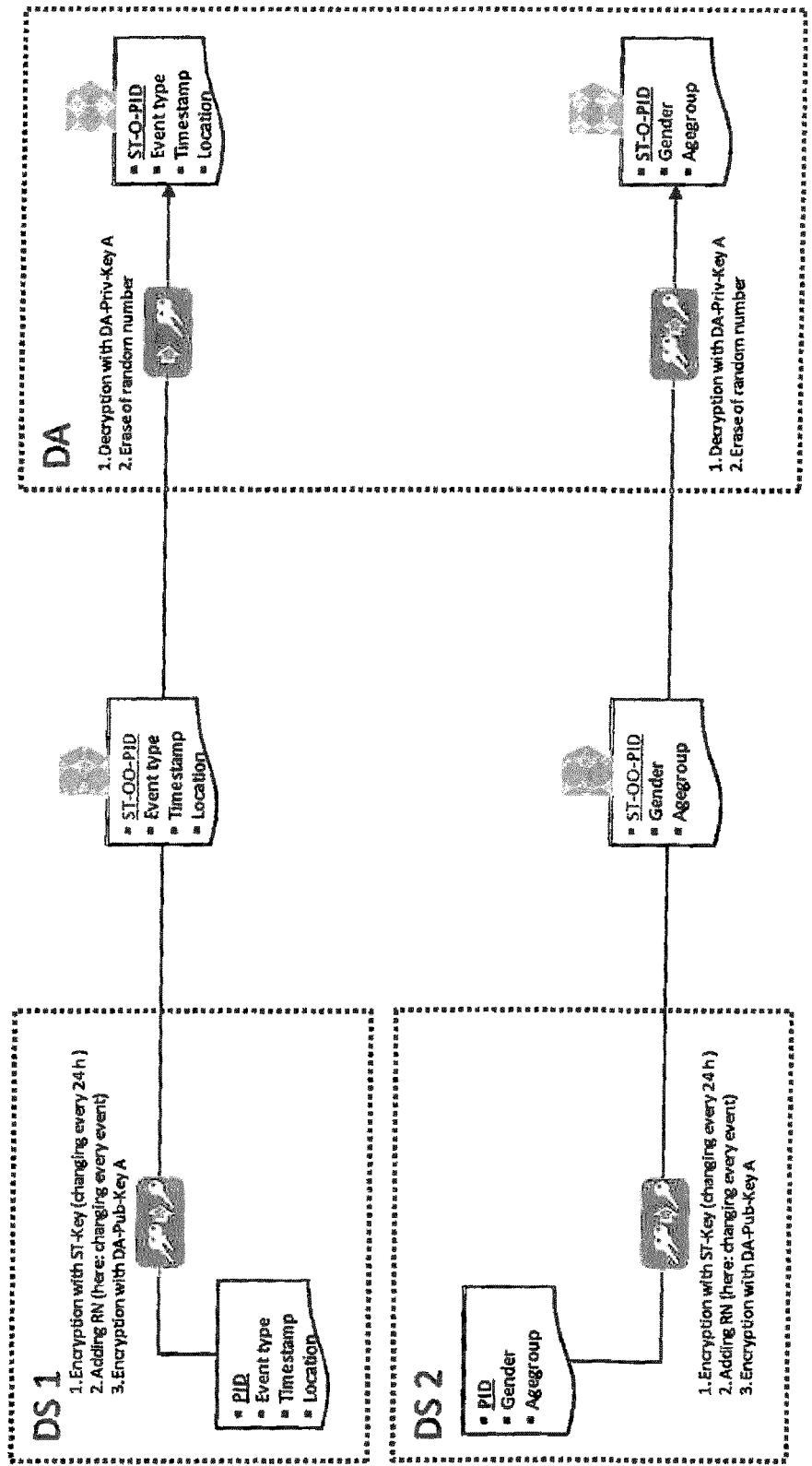

A slightly differing version of the embodiment described above is shown in FIG. 2b. This process model differs from that shown in FIG. 2b in the fact that the two MA processes are performed by two different data aggregators DS1 and DS2. In the case of a mobile network operator this could for example become necessary, if parts of the infrastructure (like the mobile network for instance) are outsourced to other companies.

To generate equal O-PIDs both data aggregators need to use the same DS-Key as well as the same technique regarding the addition of random numbers to this outcome. The data aggregator could provide different public keys out of different key sets. To keep it simple, in this example, both DSs work with the same public keys, namely DA-Pub-Key A.

Figure 3A:
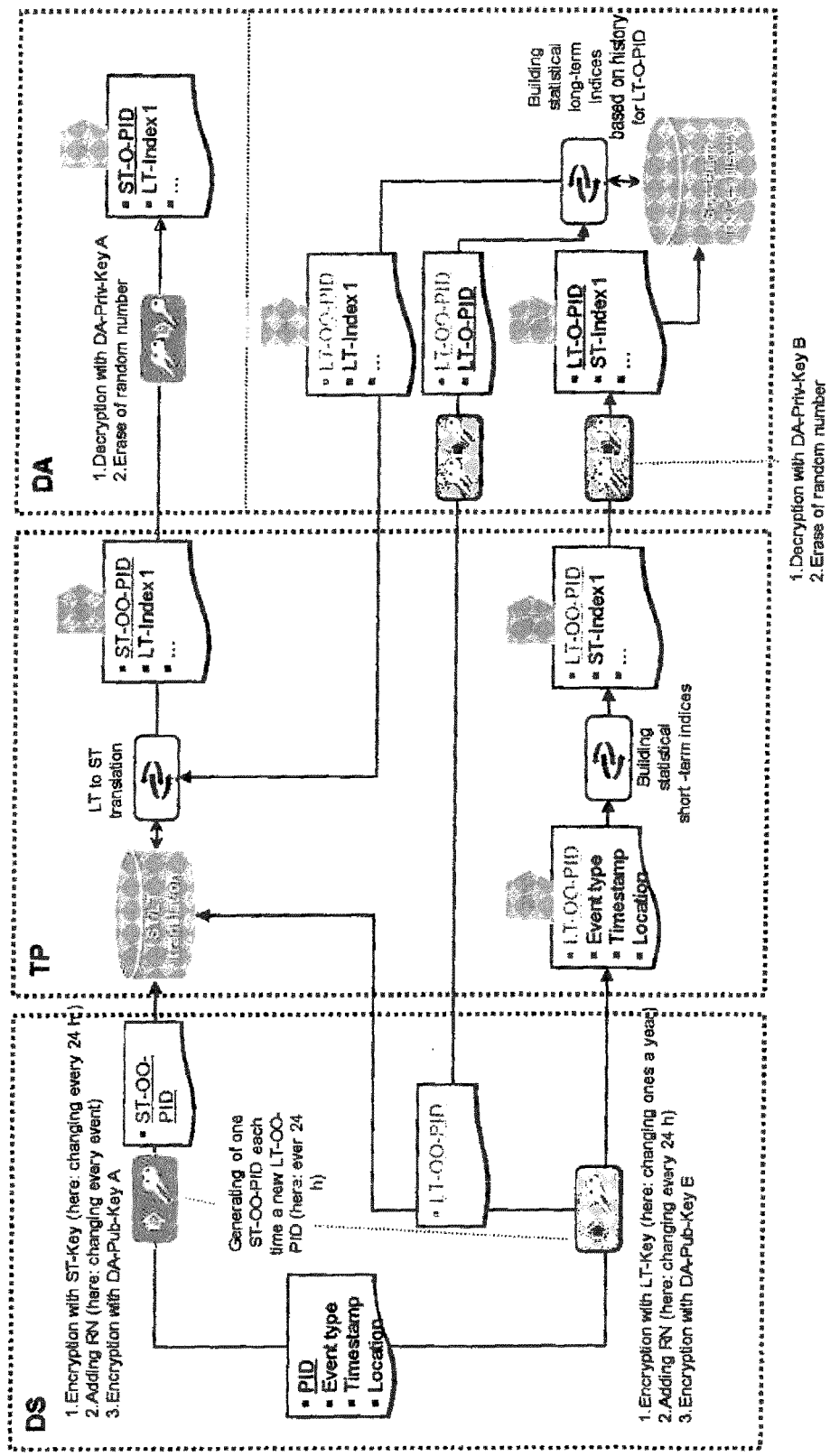
FIG. 3a, 3b: two versions of an architectural overview for the anonymous long-term indexing process according to the invention.

An embodiment disclosing the anonymous long-term indexing process (ALIP) is depicted in FIG. 3a. This embodiment should enable the calculation of long-term statistical indices that allow likelihood statements on mobility and activity based on location event data, without saving any detailed event history. The general challenge is posed by the fact that the accuracy of such statistical statements directly depends on the amount of data which is available for derivation of statements. If, for example, a mobile network operator wants to calculate the zip code where an anonymised personal identifier (O-PID) probably lives a respective probability is statistically derivable by counting the number of events assigned to this O-PID in different locations between 7 pm and 7 am at working days. In this context it is very important to recognize and filter out irregularities (holidays, business trips, etc.) to generate accurate statements. Filtering can be done by way of integrating historical comparison-values over a longer period of time. This argumentation could be spread to many other mobility and activity applications (e.g. working zip code, average usage behaviour of several services, . . . ). Generally, the accuracy of the calculated statistical statements depends on the amount of location event data collected within a given time interval. The more data is used for calculation the better is the accuracy. Further, the accuracy will also increase if the defined time interval for data collection is extended.

However, an increasing number of collected and stored location event data proportionally increases the probability for a successful identification of unique movement patterns from the stored data. These patterns allow a conclusion to be drawn about the actual identity of a person or the other way around. According to European data protection standards it is mandatory to minimize the risk of pattern identification. In the light of the above the ALIP process of building long term indices without saving detailed event history is another core component of this invention.

The following variations of anonymous long-term indexing processes (ALIP, shown in FIG. 3a and FIG. 3b) describe technical solutions for such an issue based on the general technique of the Multilevel Anonymisation Process (MAP) as introduced above. The basic idea envisages dividing different parts of the process as well as the extent of visible data between different participating entities. Beside the known Data Supplier(s) and the Data Aggregator(s) a Trusted Partner TP is introduced as a new instance between DS(s) and DA(s). The Trusted Partner TP builds statistical indices based on actual location event data sets over a short-term period and forwards only these indices (but no actual location event data at all) to a DA. The respective DA associates these indices with historical comparison-values over a long-term period.

The following explanation describes a possible process variation visualized in FIG. 3a. In this variation one single DA is responsible for the calculation of the long-term indices as well as the data aggregation. Since data aggregation is based on a short-term obfuscated personal identifier (ST-O-PID) and long-term indices are identified with a long-term obfuscated personal identifier (LT-O-PID) the DA is not able to combine both data sets directly within his premises. A combination always requires a translation through the trusted partner. Nevertheless, in some cases it might be desired to spread the long-term indices calculation and the data aggregation tasks over two independent data aggregators (DA 1 and DA 2). Such a respective modified version of the embodiment according to FIG. 3a is visualized in FIG. 3b and which operates analogue to the version described above and in the following.

At the data supplier DS side location event data consisting of a personal identifier PID and the data attributes event type, timestamp, location is applied to two different kinds of anonymisation processes based on the MAP logic as described earlier. The first MAP operates with the same short-term DS-Key which is also used to encrypt location event data as described in the first embodiment of this invention. Therefore, the key also changes exemplary every 24 hours (ST-Key). The outcoming ST-O-PID is added by a changing random number RN changing every time this first MAP is performed with a known number of digits and afterwards encrypted for a second time by use of public key provided by the DA (DA-Pub-Key A). The first MAP is triggered once a time a new long-term double obfuscated personal identifier LT-OO-PID is generated by the second MAP (cf. later). The outcome of the first process is a single ST-OO-PID which can be decrypted by the DA to get a ST-O-PID as an unique identifier for the combination with other data sources at a later point of time. The lifetime of this ST-O-PID at the DA will be 24 hours in the given example.

The second MAP operates with a long-term DS-Key (LT-Key). According to the illustrated embodiment of FIG. 3a the LT-Key is changed once a year. The first-level encryption of the PID with the LT-Key results in a LT-O-PID. In the second step a random number (with a known number of digits) is added to the LT-O-PID. In the given example the RN changes in the same time periods as the ST-Key does. Therefore, the RN is constant for 24 hours. Within the second-level encryption the combination of LT-O-PID+RN is obfuscated by using another public key from the DA (DA-Pub-Key B). Hence, the resulting LT-OO-PID is constant for all events transmitted to the trusted partner TP within 24 hours. After the data aggregator decodes the LT-OO-PID a constant LT-O-PID for one year is available at the DA.

As mentioned before the first MAP for generating the ST-OO-PID is triggered only ones a time, when a new LT-OO-PID is generated by the second MAP (in the example described here this is every 24 hours when the RN of the second MAP changes). At this moment the ST-OO-PID (without any further attributes) and the respective LT-OO-PID (out of a complete location data set including all attributes) are transmitted to the trusted partner TP. At the same time the LT-OO-PID (without any further attributes) is also forwarded to the DA. Here, it is used to send back the values of the long-term indices as they have been calculated until the end of the last LT-OO-PID lifetime (This is described in detail later).

Figure 3B:
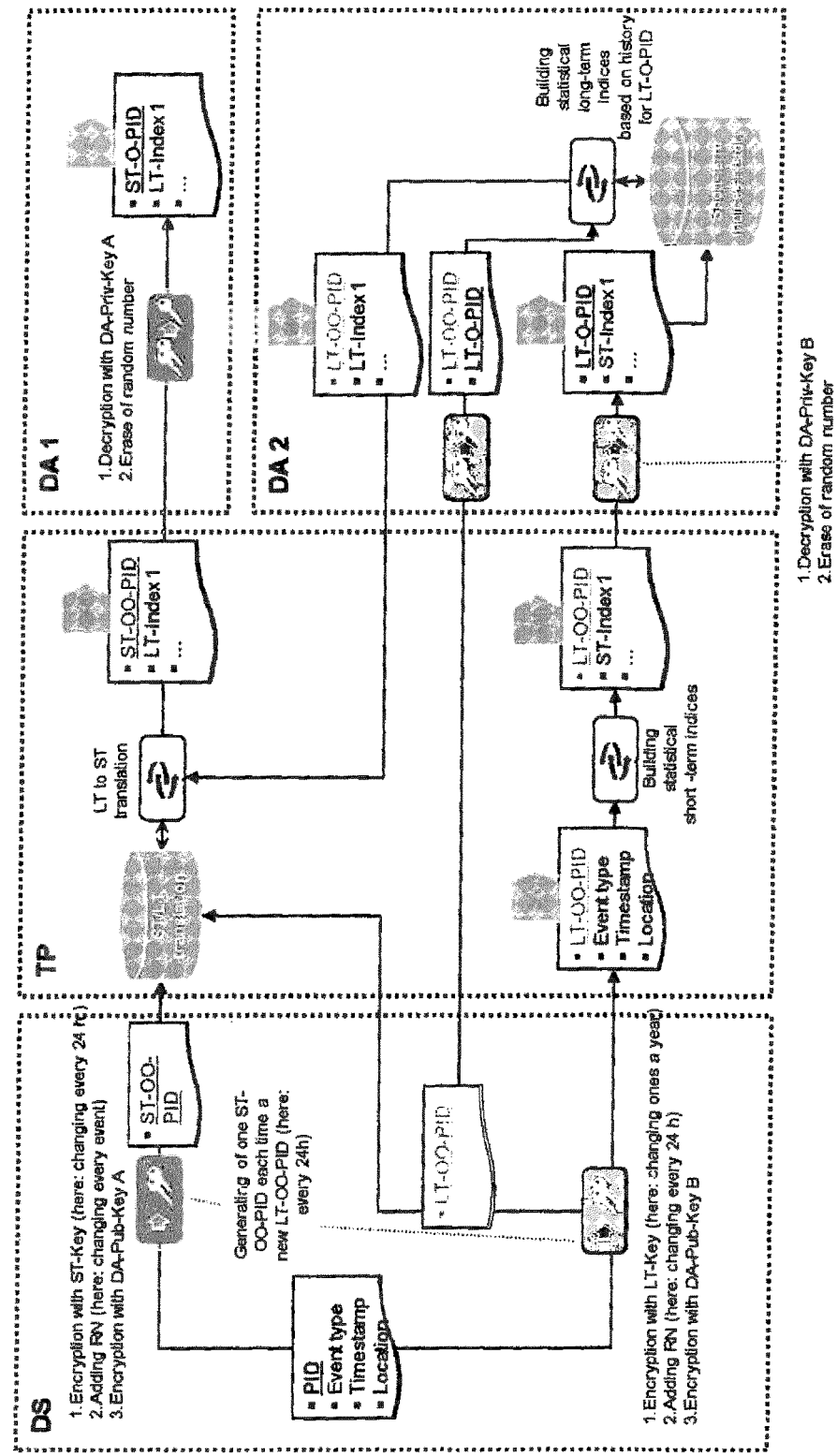

The TP saves the allocation between ST-OO-PID and LT-OO-PID in a ST/LT translation table. Afterwards the trusted partner builds statistical indices based on the location event data sets that are delivered by the DS through the second MAP within the lifetime of the LT-OO-PID (here: 24 hours). As these indices are calculated within a short-term interval they are called short-term indices. In the FIGS. 3a and 3b shows a single index (ST-Index 1) as a representative for a few potential indices which could be calculated at this point. The term statistical index in this description should include simple frequency values (e.g. number of SMS send over the short-term period) as well as likelihood values (e.g. 80% of the events between 7 pm and 7 am occurred at a geographical region having the zip code 80639). The original location events are discarded after they have been processed for calculating several statistical indices. Before the end of the LT-OO-PID-lifetime a new data set with the LT-OO-PID as well as all ST-Indices build for this identifier within the short-term period at the TP are sent to the data aggregator DA.

The DA decrypts the LT-OO-PID by using the appropriate private key (DA-Priv-Key B). The outcoming long-term identifier LT-O-PID enables the DA to combine the new short-term indices received from the TP with historical values for the same indices. Therefore, the DA firstly saves the new values to his data base (short-term indices history) and calculates new long-term indices (e.g. LT-Index 1) based on all (new and historical) values in the data base afterwards. These long-term indices are combined in a new data set and saved with the LT-O-PID as an identifier until the beginning of a new LT-OO-PID period.

At the beginning of the new period a new LT-OO-PID is forwarded from the DS to the DA as described before. This LT-OO-PID is decrypted by use of the DA-Priv-Key B to find out the appropriate LT-O-PID. Afterwards, the long-term indices which have been stored for the LT-O-PID in the short-term indices history data base until that point of time are combined with the newly received LT-OO-PID. If no historical values are available at the data base a dummy value "n.a." is applied to all attributes of the newly generated data set before retransmitting said data set to the TP.

As the TP gets this new data set with LT-OO-PID and the long-term indices calculated by the DA, he looks up the appropriate ST-OO-PID he saved for the LT-OO-PID in the ST/LT translation table before. After changing the LT-OO-PID with the ST-OO-PID he forwards the data set to the DA again. To ensure, that the DA could use the translation table only ones within an LT-OO-PID lifetime period, the used ST/LT allocation may be deleted afterwards.

Again at the DA the ST-OO-PID is decrypted with the DA-Priv-Key A. The outcoming ST-O-PID as a unique identifier finally allows the combination of the long-term indices with other data sources like location event and customer class data. By transmitting the long-term indices which have been calculated until the end of the last LT-OO-PID lifetime period at the beginning of the new LT-OO-PID lifetime period the ALIP ensures the availability of long-term indices (or dummy values) at every time of the ST-O-PID lifetime.

The given technical solution provides a possibility to calculate anonymous long-term statistical indices without saving any location event data over a longer period of time. As already mentioned above the second version of this solution (FIG. 3b) operates in the same way, but spreads the calculation of long-term indices and the combination of the several data sources to two different data aggregators.

Figure 4:
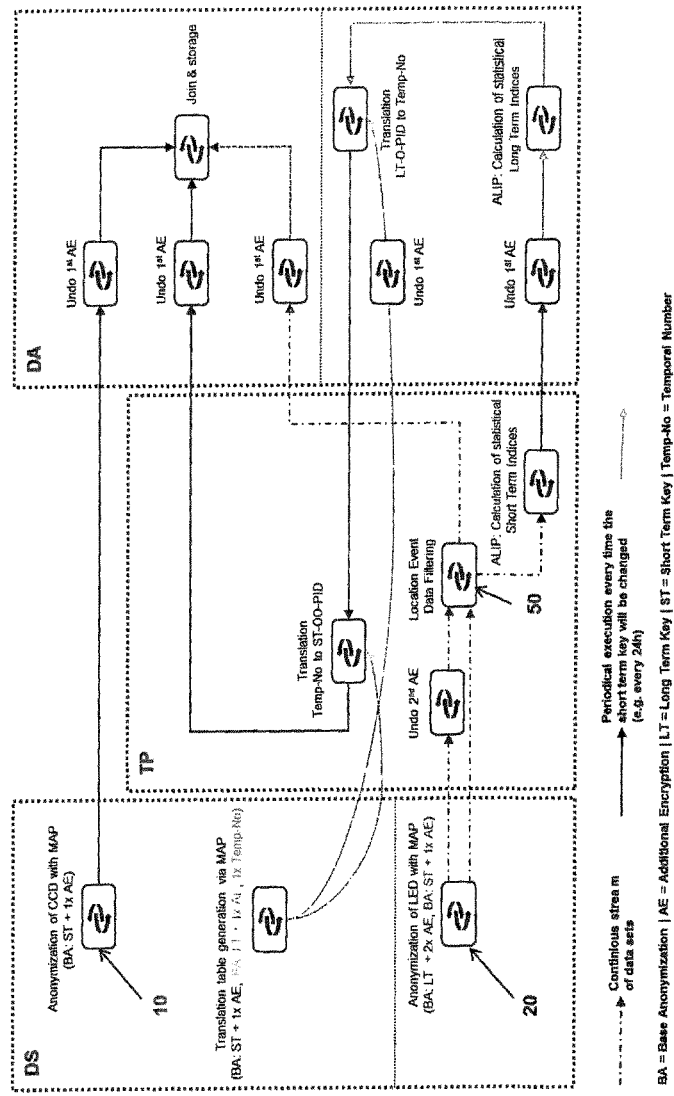
FIG. 4: an architectural overview over a system for the anonymous long-term indexing process according to a preferred embodiment of the present invention.

FIG. 4 shows a possible embodiment of the present invention. It describes the aforementioned ALIP process in a slightly different manner.

FIG. 4 shows a technical solution for the anonymisation of different data sets delivered by one single data supplier DS. Anonymisation as well as the transmission of these data sets to one single data aggregator DA is processed by entirely separated processes running at the data supplier DS. The different kinds of data sets can be combined on the basis of the equal identifiers O-PID at the data aggregator DA.

The whole process is subdivided into two independent multi-level anonymisation processes (MAP) 10, 20 where the personal identifiers PID (as unique elements between the data sets) are separately anonymised and transmitted to the data aggregator together with their respective data sets. Thereby, the first MAP process 10 is responsible for transmitting the so-called customer class data which includes attributes classifying the subscribers into different subscriber class groups, for instance gender or age groups. The personal identifier is anonymised by the basic MAP according to FIG. 1a using a seed (DS-key) with short lifetime. The resulting ST-OO-PID is transmitted together with the CCD-data set to the data aggregator DA. The additional encryption is reversed at DA in block 11, the resulting ST-O-PID is stored with the associated data set in block 12.

The second MAP process 20 is responsible for transmitting the so-called location event data sets with attributes including the event type, a timestamp when the event occurred and the subscriber location defining the location where the event occurred. The location data set mandatorily includes at least a timestamp, further attributes as event type and location are optional. Similar to the embodiment according to FIGS. 3a, 3b the PID for each location event data set is also anonymised twice by two MAP operations in MAP process 20.

The first MAP operation of the MAP process 20 is exactly the same according to FIGS. 3a, 3b. Therefore, the key also changes exemplary every 24 hours (ST-Key). The outcoming ST-O-PID is added by a changing random component RC changing every time this first MAP is performed with a known number of digits and afterwards encrypted for a second time by use of public key provided by the DA (DA-Pub-Key A). The first MAP is triggered once a time a new long-term obfuscated personal identifier LT-OOO-PID is generated by the second MAP operation (cf. later). The outcome of the first process is a single ST-OO-PID which can be decrypted by the DA to get a ST-O-PID as an unique identifier for the combination with other data sources at a later point of time. The lifetime of this ST-O-PID at the DA will be 24 hours in the given example. Said ST-OO-PID is also send via the TP to the DA. The disclosed intermediate step ("Location Event Data Filtering") at the TP is not relevant for the understanding of the present invention.

The second MAP operation slightly differs from that of FIGS. 3a, 3b. Basically, the second MAP operation refers to the implementation depicted in FIG. 2. The basic anonymisation of the PID with the LT-Key (for instance one year) results in a LT-O-PID. In the second step, two iterations of the additional encryption are executed. The random component of the first iteration changes in the same time periods as the ST-Key does, i.e. for every 24 hours. The random component of the second and last iteration changes with every location event data set.

Hence, the resulting LT-OOO-PID is transmitted to the TP and the last iteration is reversed at the TP by using the private key of the TP. Therefore, the resulting LT-OO-PID is constant for all events transmitted to the Trusted Partner TP within 24 hours.

In block 60 the Trusted Partner TP builds statistical indices based on the location event data sets that are delivered by the DS through the second MAP operation within the lifetime of the LT-OO-PID (lifetime of RC is 24 hours). As these indices are calculated within a short-term interval they are called short-term indices. The statistical indices include several attributes including an index type, a reference, a value and an alpha. The attribute index type may characterise a certain event type, for instance SMS. The attribute value includes simple frequency values (e.g. number of SMS send over the short-term period) as well as likelihood values (e.g. 80% of the events between 7 pm and 7 am occurred at a geographical region having the zip code 80639). The original location events are discarded after they have been processed for calculating several statistical indices. Before the end of the LT-OO-PID-lifetime a new data set with the LT-OO-PID as well as all ST-Indices build for this identifier within the short-term period at the TP are sent to the data aggregator DA.

The DA decrypts the LT-OO-PID by using the appropriate private key (DA-Priv-Key B). The outcoming long-term identifier LT-O-PID enables the DA to combine the new short-term indices received from the TP with historical values for the same LT-O-PID. Therefore, in step 70 the DA firstly saves the new values to his data base (short-term indices history) and calculates new long-term indices based on all (new and historical) values in the data base afterwards. These long-term indices are combined in a new data set and saved with the LT-O-PID as an identifier until the beginning of a new LT-OO-PID period.

It may be desirable to store these long-term indices in a common database for all data sets received at the DA. Therefore, a mapping algorithm similar as disclosed by the embodiment according to FIG. 3a, 3b is necessary. However, the approach for generating and using the translation table slightly differs from that of FIGS. 3a, 3b.

According to the embodiment to FIG. 4, a translation table is generated at the DS when executing both MAP operations of MAP process 20. DS comprises a translation table generator component 30 which generates different anonymous Identifiers by using different MAP instances with appropriate seed for base anonymisation.

In the depicted embodiment of FIG. 4 component 30 generates a table including tuples of ST-OO-PID (with 24$h$ constant seed for base anonymisation) and LT-OO-PID (with one year constant seed for base anonymisation). In other embodiments more different anonymous identifiers are conceivable (X-OO-PID, Y-OO-PID).

Further, component 30 also generates one unique random "number" for each tuple of anonymous identifiers. The result is a table with one column for all representations of each anonymous identifier and one extra column containing the unique random number for each tuple

[ST-OO-PID|LT-OO-PID| . . . |Unique random number].

The generated table is forwarded to a translation table distribution component which is also implemented at the DS (not shown in FIG. 4). Said translation table distribution component defines which of the anonymous identifiers has to be used as integration ID (in the embodiment of FIG. 4 the ST-OO-PID is selected). Afterwards, the distribution component generates a two-column table for each kind of anonymous identifier containing the representations of the respective anonymous identifier and the appropriate unique random numbers.

The resulting tables may look like:
[ST-OO-PID|Unique random number] (Table 1)
[LT-OO-PID|Unique random number] (Table 2)

In other embodiments more tables for different extraction components are conceivable: [X-OO-PID|Unique random number] etc.

Table 1 marked as "integration table" is forwarded to the integration component 40 located at the TP. Each "Extraction-Table" (table 2) is forwarded to the appropriate extraction component 80 located at the DA.

The Extraction component 80 receives the appropriate "Extraction-Table" (table 2) and reverses the first iteration of the additional encryption on all double obfuscated Identifiers stored within the table, i.e. all LT-OO-PID are decrypted to LT-O-PID) (block 81).

In a next step the respective LT-O-PID stored with their Long-Term indices at database of component 70 are replaced by appropriate unique random numbers. The resulting "table of attributes" with unique random identifiers is forwarded to integration component 40.

Integration component 40 receives the "Integration-Table" of distribution component 30. Further, the resulting "table of attributes" is received from the extraction component 80. The integration component 40 combines all attributes from the different "Attribute-Tables" by the given unique random number of each "Attribute-Table" and replaces the Unique random numbers by the appropriate destination encrypted identifier, which refers to the ST-OO-PID. The newly combined "attributes table" including the long-term indices and the ST-OO-PID is sent back to the DA for storing the collected information in a common database 100.

Figure 5:
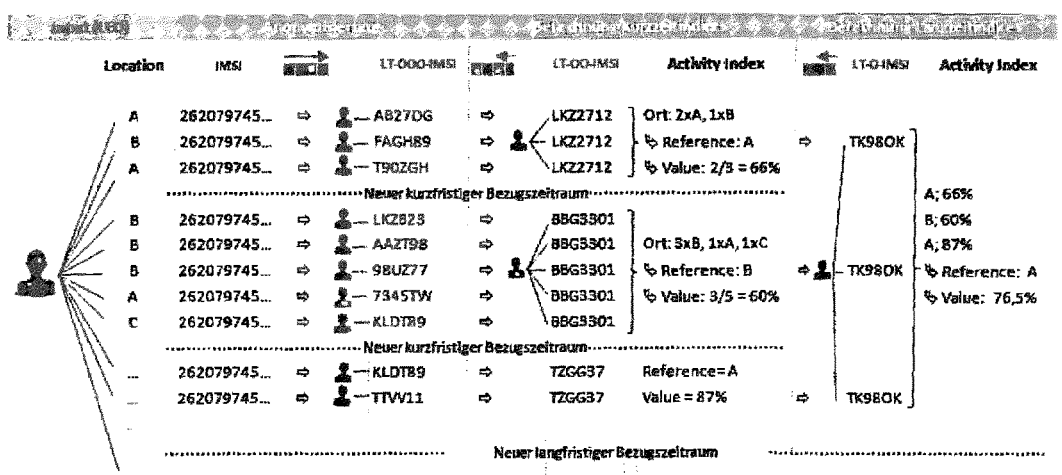
FIG. 5: an example embodiment for calculating statistical indices according to the invention

FIG. 5 shows a possible approach for building long-term indices which is implemented at the TP. The figure shows different location events triggered by a single subscriber at different locations A, B, C over a certain time interval. Different events may be an outgoing/incoming phone call or SMS, etc. The subscriber is characterised by a certain IMSI which remains constant over the investigated time interval.

Column 200 shows the Multi-iteration implementation of MAP for ALIP. Since the random component used for the last iteration of the additional encryption changes for every event each resulting LT-OOO-IMSI differs from each other.

In the next step 300 short-time indices are calculated at the TP. Therefore, the last iteration is reversed by the private key of the TP. As can be seen in FIG. 5 the resulting LT-OO-IMSI are constant within a certain time interval (short-term interval) which refers to the lifetime of the random component used for the first iteration of the additional encryption. The TP now calculates an activity index for a certain location. Events ABA occurred during the first short-term interval 100. Since two events have been triggered at location A and only one event B has been triggered at location B the reference value within said time interval 100 is A with a probability value of 66%. A different reference value B with a probability of 60% is calculated for time interval 101 wherein reference value A for time interval 102 has been determined with a probability of 87%.

The calculated short-term indices are transmitted after each time interval 100, 101, 102 to the DA. At the DA the LT-OO-IMSI is decrypted resulting in a single obfuscated LT-O-IMSI which remains constant over the time interval LT which is one year. Short-term indices which are received within the LT time interval can be associated with a common LT-O-IMSI and new long-term indices can be calculated on the basis of the collected short term indices. According to the shown example of FIG. 5 arbitrary events are triggered by a single subscriber at location A within one year with a probability of 76.5%.

Figure 6A:
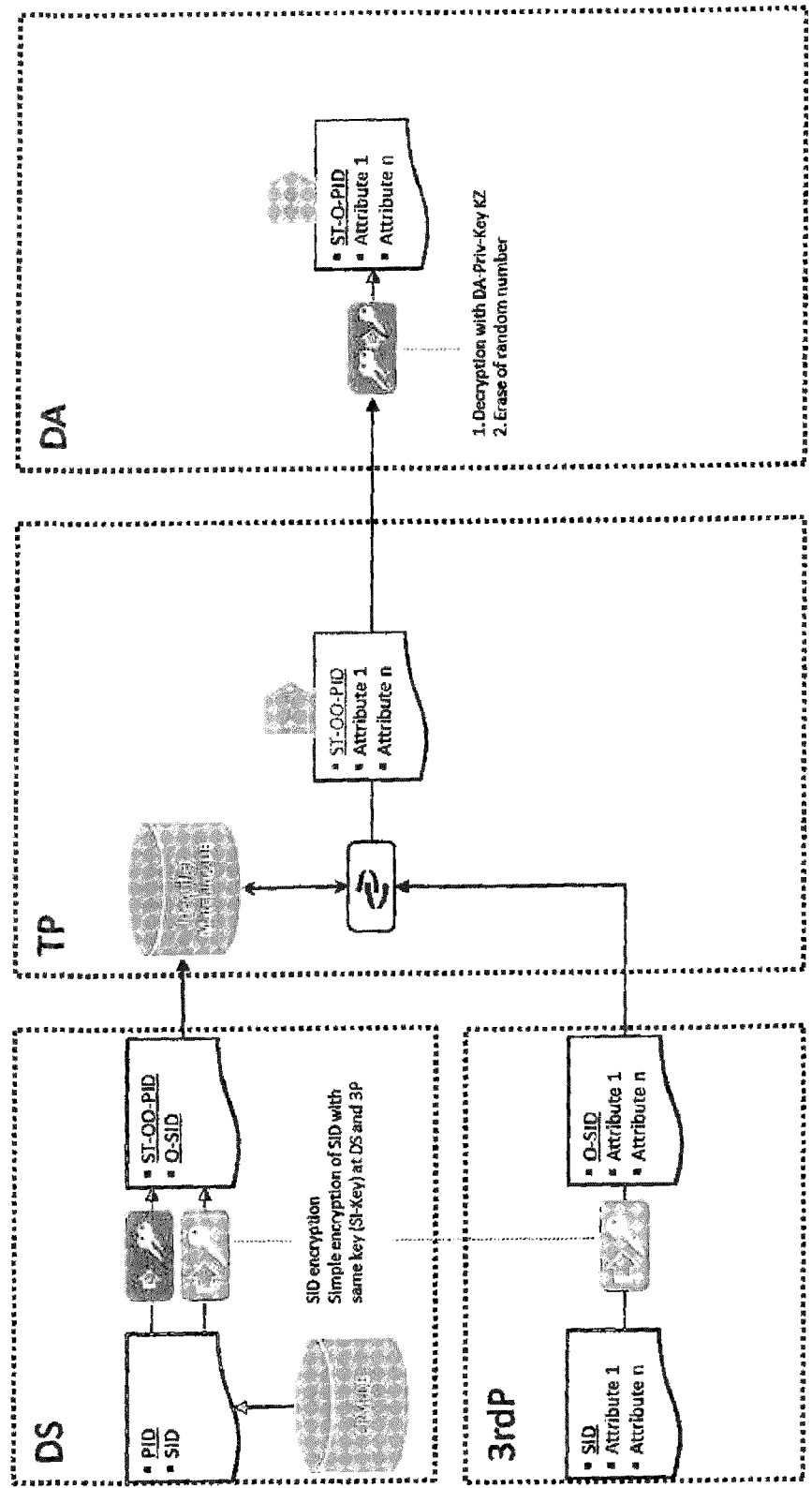
FIG. 6a, 6b: two versions of another preferred embodiment of the present invention.
Figure 6B:
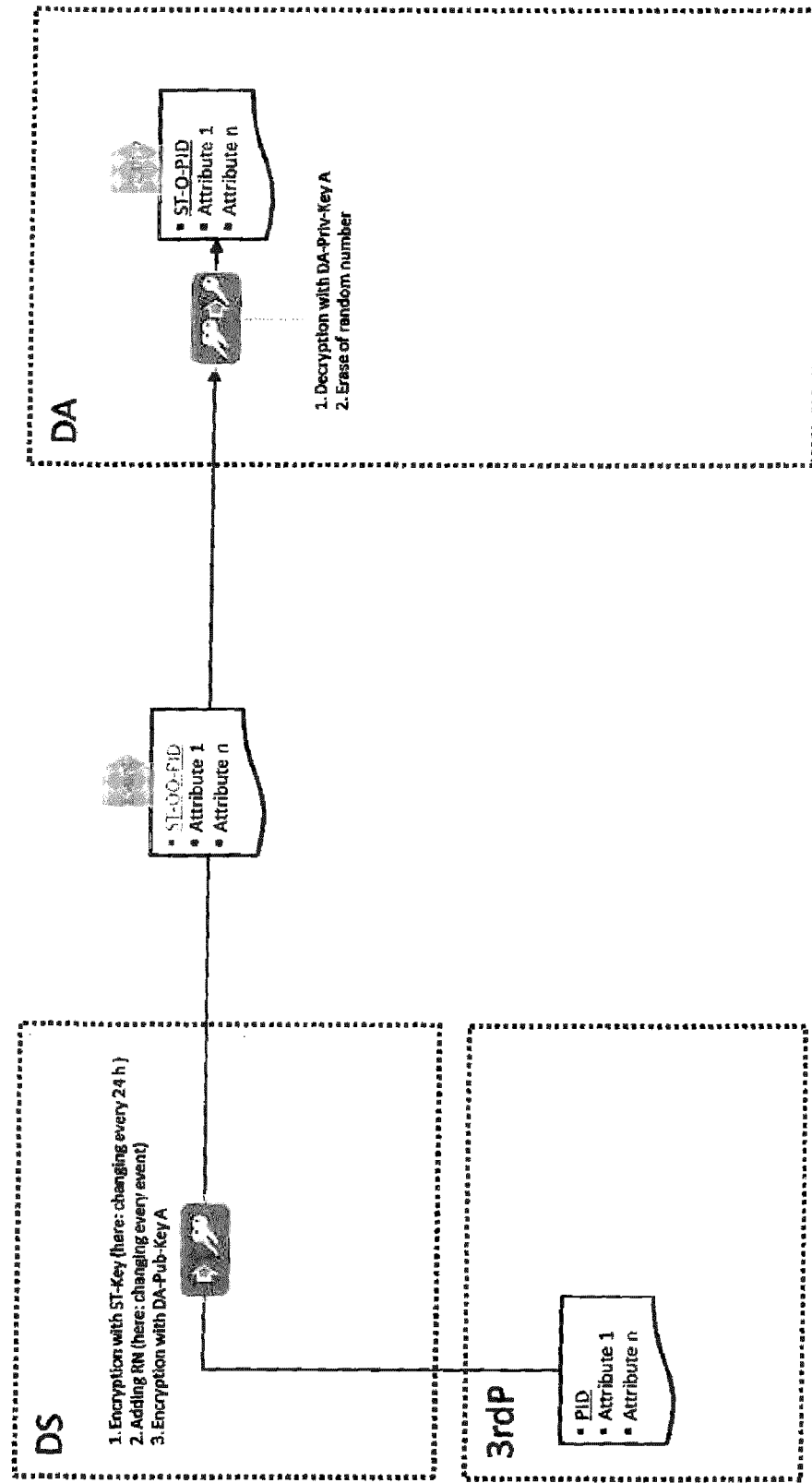

Another embodiment of the present invention is shown in FIGS. 6a and 6b. This embodiment provides a solution for a third-party 3rdP application to provide additional data attributes (Attribute 1 . . . Attribute n) identified either by a secondary personal identifier (SID), which is also known by the DS (variant 1 according to FIG. 6a), or by the original PID from the DS (variant 2; FIG. 6b). In this context the 3rdP acts as a data delivery entity similar to the DS. An important difference between the DS and the $3^{rd}$ party entity is that the 3rdP does not perform the MAP by itself.

According to a first variant (FIG. 6a) a Trusted Partner TP matches data set received from the 3rdP to a short-term double encrypted personal identifier (ST-OO-PID) generated (through a MAP) and provided by the DS. Such scenario might be reasonable if the 3rdP is not willing or allowed to provide its Data directly to the DS. The following argumentation describes this process based on a secondary identifier (SID). It is also possible to perform the matching process of the trusted partner TP by use of the personal identifier PID. Therefore, the PID simply needs to be encrypted in the same way described for the SID. I.e it has to be encrypted a second time parallel to the MAP in a single-level process.

Beside the generation of the ST-OO-PID the DS also defines a new key for encryption of the secondary identifier SID (SI-Key). On the one hand this key is used by the DS to encrypt all SIDs in his database with a simple (one-level) encryption to get O-SIDs. On the other hand the key is provided to the 3rdP to enable the same process on their data sets. The outcome at the DS is an allocation table that links all O-SIDs to appropriate ST-OO-PID. The table is transmitted to the trusted partner TP.

The 3rdP also applies the one-level encryption to the SID identifier included in their data sets with additional attributes. The resulting data sets including the O-SID as an identifier are transmitted to the TP.

The TP now performs a data base look up in the Identifier Matching DB to find out the appropriate ST-OO-PID for the O-SID of every data set received from the 3rdP. After the replacement of the identifier the new data set including the ST-OO-PID and the additional attributes of the 3rdP is forwarded to the data aggregator DA.

The DA decrypts the ST-OO-PID (according to the MAP logic described earlier) and gets the ST-O-PID. Based on this unique identifier the DA can perform the combination with other data sources like location event data, customer class data or long-term indices.

In the second variant (FIG. 6b) hiding 3rdP information from the DS is not desired. In this case the 3rdP could simply transfer its data to the DS, where it is encrypted through an MAP in the same way as any internal data source of the DS. After decrypting the ST-OO-PID at the DA a data combination is possible in the common way.

The invention claimed is:

1. A method for anonymisation by transmitting an event data set from at least one data supplying entity supplying the event data set, to at least one data aggregating entity aggregating the event data set, wherein the data set includes at least one identifier identifying at least one user of the data supplying entity, the method comprising the steps of:
   a. performing a non-reversible basic encryption of the at least one identifier using an encryption mechanism with a certain lifetime,
   b. iteratively performing an additional encryption of said basic encrypted identifier for n-times with n equal or greater than 1 resulting in an additional encrypted identifier, wherein
   the additional encryption comprises the steps of adding a random component to said encrypted identifier and encrypting the output using asymmetric encryption with a public key, and
   each iteration uses a random component with a lifetime shorter than the lifetime of the certain lifetime according to step a and than the lifetime of the previous iteration and a public key different to that of the previous iteration,
   c. transmitting the event data set characterised by the n-times additional encrypted identifier to the at least one data aggregating entity, and
   d. undoing at least one iteration of the additional encryption(s) at the at least one receiving data aggregating entity.

2. The method according to claim 1 wherein the event data set includes at least one attribute associated with the at least one identifier/user and including at least one of the group of type of event and/or the timestamp of an event and/or the location of an event.

3. The method according to claim 2 wherein the at least one data supplying entity and the at least one data aggregating entity are represented by two independent processes executed on the same system and/or on physically separated systems, in particular located at different installation locations.

4. The method according to claim 3 wherein the lifetimes of the certain lifetime of step a. and/or the lifetimes of the random components can be varied, in particular depending on the attributes of the event data sets.

5. The method according to claim 1 wherein the at least one data supplying entity and the at least one data aggregating entity are represented by two independent processes executed on the same system and/or on physically separated systems, in particular located at different installation locations.

6. The method according to claim 5 wherein the lifetimes of the certain lifetime of step a. and/or the lifetimes of the random components can be varied, in particular depending on the attributes of the event data sets.

7. The method according to claim 1 wherein the lifetimes of the certain lifetime of step a. and/or the lifetimes of the random components can be varied, in particular depending on the attributes of the event data sets.

8. The method according to claim 1 wherein the lifetime of the random component of the last iteration changes for every data set.

9. The method according to claim 1 wherein the basic encryption is based on a hashing algorithm using a seed with a long lifetime.

10. The method according to claim 1 wherein the event data set characterised by the n-times additional encrypted identifier is transmitted to the at least one data aggregating entity via at least one trusted partner and the last iteration of the additional encryption is decrypted at the at least one trusted partner by using its respective private key and by removing the random component resulting in an base anonymised and n-time additional encrypted identifier.

11. The method according to claim 10 wherein the trusted partner derives at least one statistical index from a number of event data sets and/or data attributes related to the same base anonymised and n-time additional encrypted identifier and collected within the lifetime of the base anonymised and n-time additional encrypted identifier.

12. The method according to claim 11 wherein the derived statistical indices include at least one attribute including at least one of the group of index type and/or reference and/or value of likelihood and/or frequency and/or probability of error.

13. The method according to claim 11 wherein at least one statistical index refers to a mobility index characterising the frequency and/or likelihood for a base anonymised and n-time additional encrypted identifier associated with a certain location.

14. The method according to claim 11 wherein at least one statistical index refers to an activity index characterising the frequency and/or likelihood for a certain base anonymised and n-time additional encrypted identifier associated with a certain event.

15. The method according claim 11 wherein the derived statistical indices are forwarded together with their related base anonymised and n-time additional encrypted identifier to the at least one data aggregating entity.

16. The method according to claim 15 wherein the first iteration is decrypted at the last receiving data aggregating entity by using its respective private key and by removing the random component resulting in an base anoymised identifier with the certain lifetime and wherein the aggregating entity collects the received likelihoods and/or frequencies related to said base anonymised identifier within the certain lifetime period.

17. The method according to claim 1 wherein a big matching table is generated containing at least one data tuple for each personal identifier of the at least one data supplying entity wherein each data tuple preferably consists of one base anonymised and 1-time additional encrypted personal identifier for each different types of information that should be extracted from at least one extractor and/or hybrid data aggregating entity and/or one base anonymised and 1-time additional encrypted personal identifier for each internal table within at least one integrator and/or hybrid data aggregating entity and/or at least one unique temporal component.

18. The method according to claim 17 wherein at least one small matching table is generated for each kind of base anonymised and 1-time additional encrypted personal identifier included in the big matching table wherein each small table preferable includes a data tuple containing the base anonymised and 1-time additional encrypted personal identifier together with the unique temporal component.

19. The method according to claim 1 wherein at least one data supplying entity is a mobile communication network.

20. A communication system for performing the method according to claim 1.

* * * * *